United States Patent [19]
Kobayashi

[11] Patent Number: 5,381,877
[45] Date of Patent: Jan. 17, 1995

[54] ROTATING-PISTON TYPE ROTARY DAMPER

[75] Inventor: Yasutomo Kobayashi, Chigasaki, Japan

[73] Assignee: Nifco Inc., Yokohama, Japan

[21] Appl. No.: 162,701

[22] Filed: Dec. 7, 1993

[51] Int. Cl.⁶ .............................................. F16D 57/02
[52] U.S. Cl. .................................... 188/290; 188/293
[58] Field of Search ............................... 188/290–294, 188/268, 269; 16/85; 74/573, 574

[56] References Cited

U.S. PATENT DOCUMENTS

| | | | |
|---|---|---|---|
| 5,092,433 | 3/1992 | Endo | 188/290 |
| 5,277,282 | 1/1994 | Umemura | 188/290 |
| 5,301,775 | 4/1994 | Nedbal et al. | 188/290 |

Primary Examiner—Robert J. Oberleitner
Assistant Examiner—Chris Schwartz
Attorney, Agent, or Firm—Oblon, Spivak, McClelland, Maier & Neustadt

[57] ABSTRACT

A rotating-piston type rotary damper includes a rotor of substantially triangular prism shape, a rotor housing having an operation chamber provided with a stationary gear with external teeth, a main shaft having an operation shaft portion and an eccentric, and a lid having a through hole for permitting passage therethrough of the operation shaft portion. The rotor has a central circular through hole formed normal to its end faces so that one open side thereof serves as a fitting hole for the eccentric and the other open side thereof is provided therein with a gear with internal teeth for engagement with the external teeth and is accommodated in the operation chamber to define volume-variable compartments containing viscous liquid. The rotor has communication holes for transferring the viscous liquid in a volume-variable compartment of decreasing volume when the rotor is rotated into adjacent volume-variable compartments.

10 Claims, 6 Drawing Sheets

# ROTATING-PISTON TYPE ROTARY DAMPER

BACKGROUND OF THE INVENTION

1. Field of the Invention

The present invention relates to a rotary damper enabling generation of a large torque and which is suitable for damping the opening movement of a lid such as of a vehicle glove compartment.

2. Description of the Prior Art

Rotary dampers are widely used for damping the movement of pusher mechanisms etc. to provide a pleasing impression during use. Prior art rotary dampers have highly viscous silicone oil contained in the space between a housing and a disk-like rotor and are constructed such that during the rotation of the rotor a shearing force is generated in the silicone oil as a torque generating source, thereby producing a damping force. Since the prior art rotary dampers are bulky, in spite of generating only a small torque, they cannot be used in applications requiring a large torque and thus have limited utility. In addition, use of highly viscous silicone oil makes the rotary damper assembly troublesome.

The main object of the present invention is to provide a rotary damper that is capable of generating a large torque forits small size and is easy to assemble.

SUMMARY OF THE INVENTION

To attain the object described above, according to the present invention there is provided a rotating-piston type rotary damper comprising a rotor formed in the shape of a substantially triangular prism having apex portions provided with apex seals, the rotor having a central circular through hole formed orthogonally or normal to its end faces so that one open side thereof serves as a fitting hole and the other open side thereof is provided therein with a gear with internal teeth; a rotor housing having an operation chamber open on one side for accommodating the rotor therein and closed on the other side which is provided with a central bearing and a coaxial stationary gear with external teeth; a main shaft having an operation shaft portion at one end thereof and an eccentric near the other end thereof; and a lid having a through hole for permitting passage therethrough of the operation shaft portion of the main shaft; the rotor being accommodated in the operation chamber, with the internal teeth engaged with the external teeth and the apex seals in contact with an inner surface of the operation chamber, to define volume-variable compartments between the inner surface of the operation chamber and an outer surface of the rotor; the main shaft being inserted into the central circular through hole of the rotor, with the eccentric fitted in the fitting hole and the other end supported on the central bearing; the volume-variable compartments containing viscous liquid; the lid covering the open side of the operation chamber and being fixed on the rotor housing, with the operation shaft portion of the rotor passing through the through hole of the lid; the operation chamber having an inside configuration on which the apex seals of the rotor slide when the rotor rotates, and the rotor having an outside configuration not interfering with the inner surface of the operation chamber but making the volume-variable compartments variable in volume when the rotor rotates; the rotor having communication holes for transferring the viscous liquid in a volume-variable compartment of decreasing volume into adjacent volume-variable compartments.

In the rotating-piston type rotary damper according to the present invention, when the main shaft is rotated, the eccentric thereof causes the rotor to rotate. However, since the gear of the rotor with the internal teeth engages with the stationary gear of the rotor housing with external teeth, the rotor revolves and is rotated within the operation chamber with the apex seals sliding on the inner surface of the operation chamber. As a result, the volume-variable compartments defined between the outer surface of the rotor and the inner surface of the operation chamber independently vary in volume. The viscous liquid in the volume-variable compartment of decreasing volume flows into the adjacent volume-variable compartments through the communication holes. The resistance produced when the viscous liquid flows through the communication holes becomes rotation resistance on the rotor and in turn rotation resistance on the main shaft, thereby producing a desired damping force.

The above and other objects, characteristic features and advantages of the present invention will become more apparent to those skilled in the art from the description of the invention given hereinbelow with reference to the accompanying drawings.

DESCRIPTION OF THE PREFERRED EMBODIMENTS

The present invention will now be described with reference to the illustrated embodiments.

Figure 1:
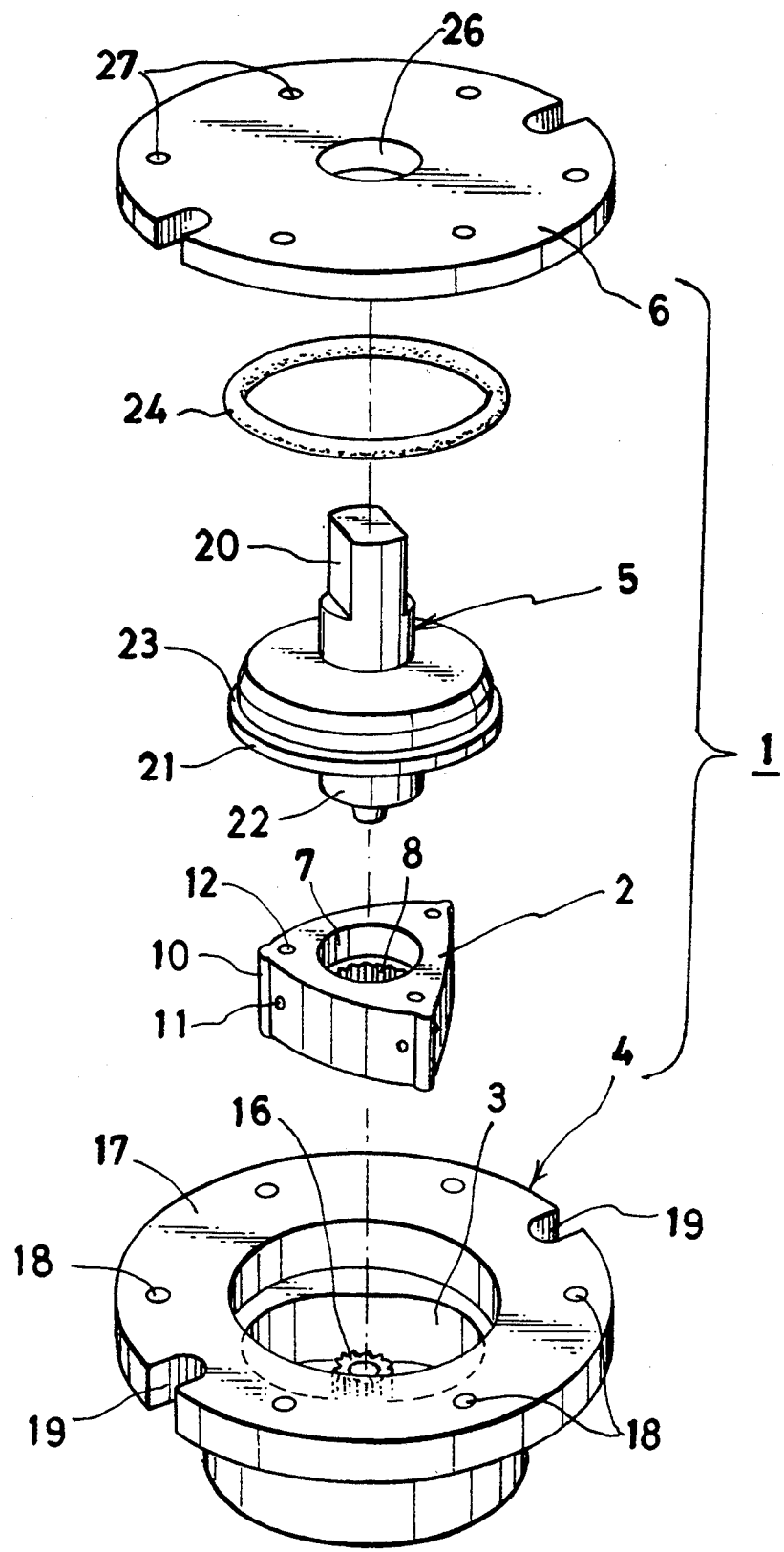
FIG. 1 is an exploded perspective view showing one embodiment of the rotary damper according to this invention.

As shown in FIG. 1, a rotating-piston type rotary damper 1 of the present invention comprises a plastic rotor 2 in the shape of a short substantially triangular prism, a rotor housing 4 having an operation chamber 3 in which the rotor 2 is rotated about a main shaft 5 while itself rotating about an eccentric 22, and a lid 6 for covering the open side of the operation chamber 3 of the rotor housing 4.

Figure 2:
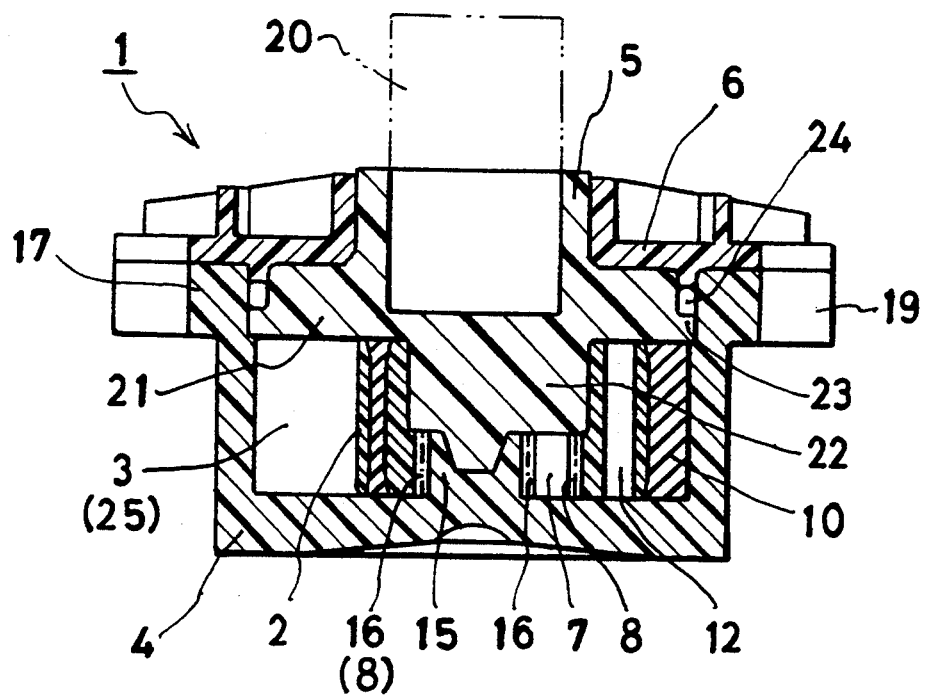
FIG. 2 is a cross section showing the rotary damper.
Figure 4:
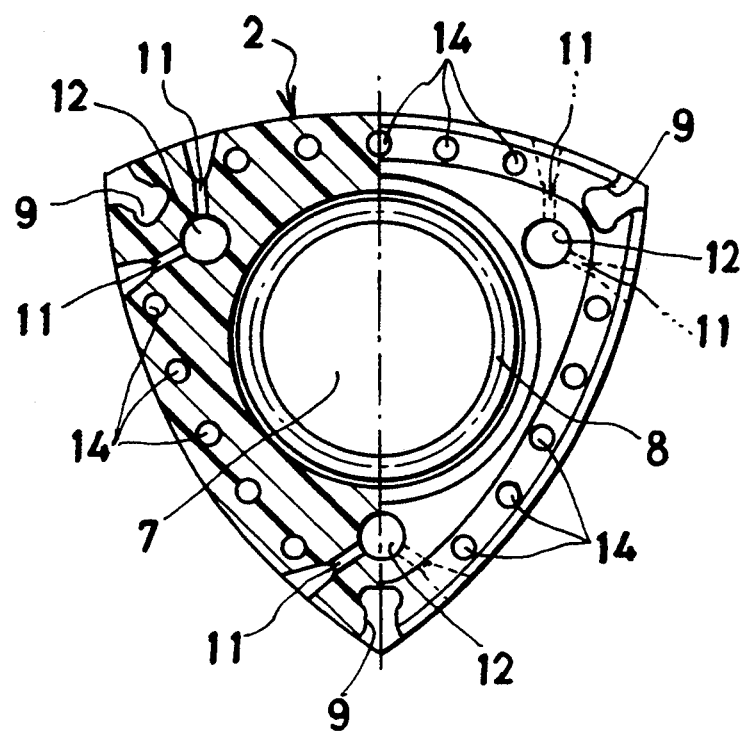
FIG. 4 is a plan view showing the rotary damper, with one half in cross section.

As shown in FIG. 4, the rotor 2 has three sides each describing the inside envelope of an epi-trochoid and a central circular through hole 7 formed vertically. It also has a fitting groove 9 formed in each of the apexes over the entire length thereof and communication holes 11 formed therein for allowing the adjacent sides to communicate with each other therethrough. As shown in FIG. 2, the circular through hole 7 of the rotor 2 serves as a fitting hole for the eccentric 22 of the main shaft 5 on one open side thereof and has on the other open side thereof a trochoidal phase gear 8 with internal teeth.

Figure 5:
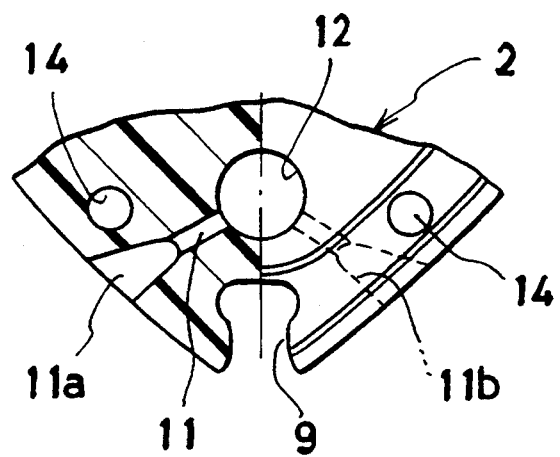
FIG. 5 is an enlarged view showing part of FIG. 4.

As shown in FIG. 5, the communication holes 11 in this embodiment are formed by forming through holes 12 in the rotor 2 normal to its end faces at positions slightly apart from the fitting grooves 9 toward the center of the rotor and boring the adjacent sides toward each through hole 12 with a small-diameter drill until the bores communicate with each other through the through hole 12. The opposite openings of the through hole 12 may be stopped up by blank caps (not shown). Open parts 11a and 11b of the communication hole 11 open respectively to the adjacent sides in the vicinity of the edge.

Figure 6:
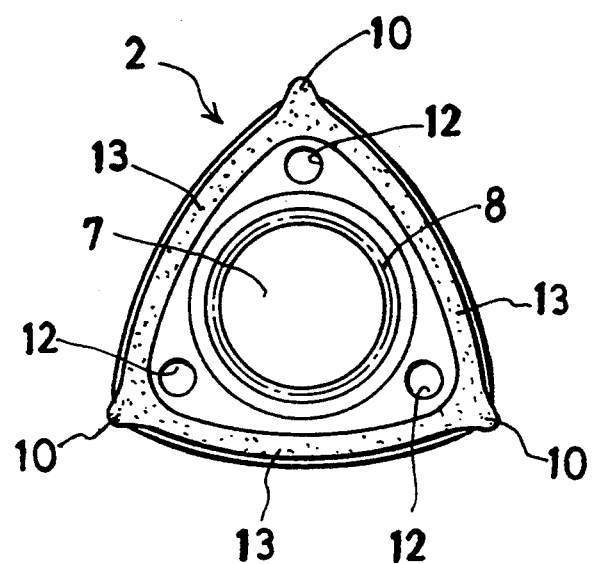
FIG. 6 is a plan view showing a rotor provided with side seals and apex seals formed by the two-color molding method.

As shown in FIG. 6, the fitting grooves 9 are filled with apex seals 10 which project over the entire length of the rotor 2, and end face seals 13 are integrally formed on the outer peripheries of the end face surfaces of the rotor 2 by the two-color molding method from elastic polyurethane elastomer resin so as to slightly project from the end faces of the rotor 2.

Denoted by reference numeral 14 in FIG. 4 are holes into which the molded elastomer body obtained by the two-color molding method penetaes for firmly attaching it to the rotor 2.

The rotor housing 4 is hat-shaped and made of plastic. It comprises the operation chamber 3 open on one side and a flange 17 having a plurality of fastening holes 18 for fastening the lid 6 thereto and two mounting notches 19 for mounting the rotary damper 1. The inside configuration of the operation chamber 3 describes two epitrochoids and the closed side thereof is provided at the center with a bearing 15 (FIG. 2) and a stationary gear 16 having external teeth. The bearing 15 and stationary gear 16 are integrally formed coaxially.

The main shaft 5 has an operation shaft portion 20 chamfered at one end thereof, a stepped flange 21, the eccentric 22 and a projection at the other end thereof. The stepped flange 21 has a shape and size capable of covering the open side of the operation chamber 3 of the rotor housing 4 and has a stepped portion 23 on which an O-ring 24 is fitted. Though the operation shaft portion 20 is shown as a part of the main shaft 5 in FIG. 1, it may be a separate shaft connected to the main shaft 5 as shown in FIG. 2.

Figure 3:
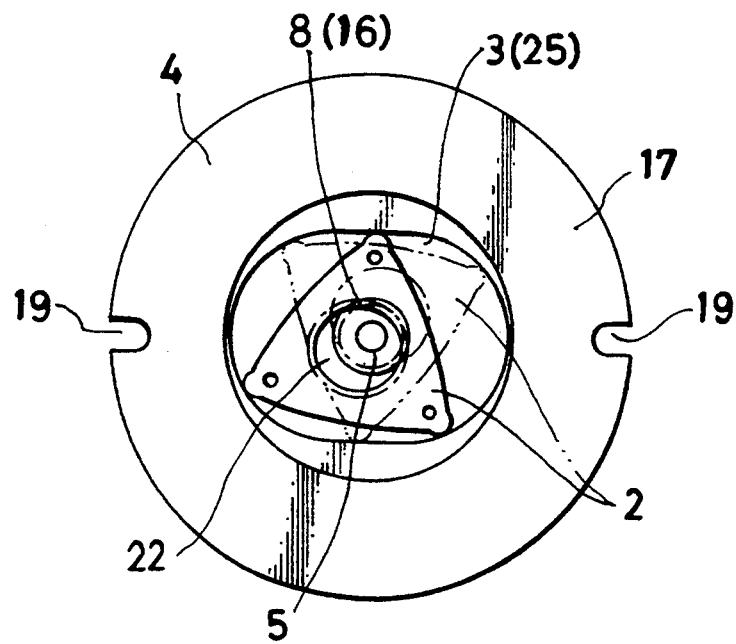
FIG. 3 is a plan view showing the rotary damper, with a lid removed.

The aforementioned component parts are assembled into the rotary damper 1 by the following procedure. The rotor 2 is accommodated in the operation chamber 3 of the rotor housing 4, with the trochoidal phase gear 8 of the rotor 2 meshed with the stationary gear 16 having the external teeth and with the three apex seals 10 in contact with the inner surface of the operation chamber 3. As a result, as shown in FIG. 3, three volume-variable compartments 25 substantially arcuate in cross section are defined between the outer surface of the rotor 2 and the inner surface of the operation chamber 3. The three volume-variable compartments 25 are then filled with viscous liquid. Thereafter, the eccentric 22 of the main shaft 5 is fitted in the fitting hole (the circular through hole 7), the lower end projection of the main shaft 5 is supported on the bearing 15, and the stepped flange 21 of the main shaft 5 is fitted in the operation chamber 3. Subsequently, the lid 6 having the operation shaft portion 20 of the main shaft 5 fitted in and passed through a hole 26 formed therein is caused to cover the rotor housing 4, and the fastening holes 18 of the flange 17 are caused to register with fastening holes 27 of the lid 6. Screws (not shown) are inserted into the registered fastening holes 27 and 18 to firmly fasten the lid 6 and the flange 17 together.

In the rotary damper 1 thus assembled, the viscous liquid contained in the volume-variable compartments 25 is prevented from leaking by the O-ring 24 even when the main shaft 5 and rotor 2 rotate.

Silicone oil etc. of the type used in conventional rotary dampers can be used as the viscous liquid for the rotary damper of this embodiment. However, since large torque can be obtained in this embodiment, it is also possible to use as the viscous liquid an oil having a viscosity not as great as that of silicone oil.

The operation of the rotary damper 1 configured in the aforesaid manner will now be described.

The main shaft 5 is rotated, for example, by giving external rotation force thereto via a gear (not shown) attached to the operation shaft portion 20. As a result, the eccentric 22 of the main shaft 5 exerts rotation force on the rotor 2, and the rotor 2 is rotated about the main shaft 5. At this time, since the internal teeth of the trochoidal phase gear 8 of the rotor 2 are in engagement with the external teeth of the stationary gear 16, the rotor 2 revolves about the eccentric 22 within the operation chamber 3, with the apex seals 10 sliding on the inner surface of the operation chamber 3. Consequently, the volume-variable compartments 25 defined by the outer surface of the rotor 2 and the inner surface of the operation chamber 3 are independently varied in terms of volume with the rotation of the rotor 2. This will be described with reference to FIG. 7(A) to FIG. 7(D), in which the three apexes of the rotor 2 are denoted by $\overline{A}$, $\overline{B}$ and $\overline{C}$, and the volume-variable compartments 25 are shown by 25AB defined between the inner surface of the operation chamber 3 and the outer surface of the rotor 2 between the apexes $\overline{A}$ and $\overline{B}$, by 25BC defined between the inner surface of the operation chamber 3 and the outer surface of the rotor 2 between the apexes $\overline{B}$ and $\overline{C}$, and by 25AC defined between the inner surface of the operation chamber 3 and the outer surface of the rotor 2 between the apexes $\overline{A}$ and $\overline{C}$.

Figure 7A:
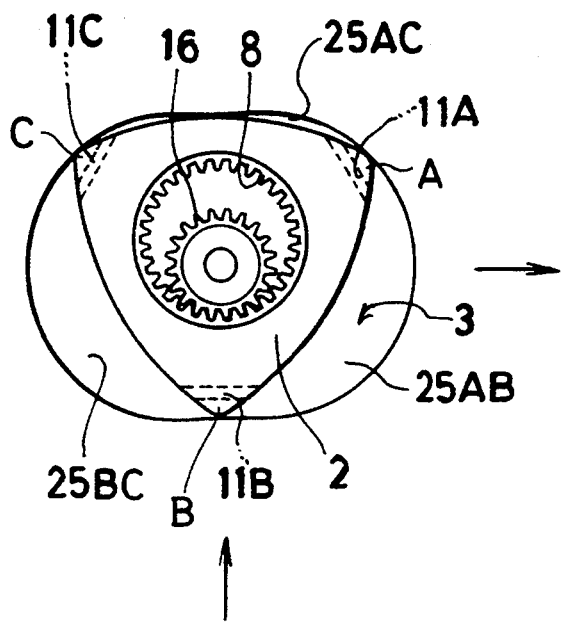
FIG. 7(A) to FIG. 7(D) are plan views showing the variation in volume of volume-variable compartments upon rotation of the rotor.
Figure 7B:
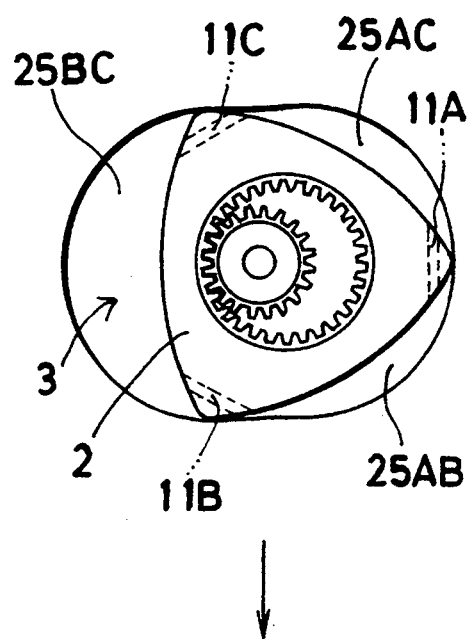

In the state of FIG. 7(A), the compartment 25AC has the smallest volume. When the rotor 2 is rotated clockwise from the state of FIG. 7(A), the compartment 25AC gradually increases in volume, whereas the volume of the compartment 25AB decreases gradually, as shown in FIG. 7(B). In the state of FIG. 7(B), the compartment 25BC has the largest volume. The larger the volume of a compartment, the lower its internal pressure. Conversely, the smaller its volume, the higher the internal pressure.

For this reason, the viscous liquid in the compartment 25AB flows into the compartment 25AC through the communication hole 11A and, at the same time, flows into the compartment 25BC through the communication hole 11B. Flow resistance occurs when the viscous fluid passes through the through holes into the adjacent compartments and acts as rotation resistance on the rotor 2. The rotation resistance of the rotor 2 becomes the rotation resistance of the main shaft 5 to manifest the damping effect.

Figure 7D:
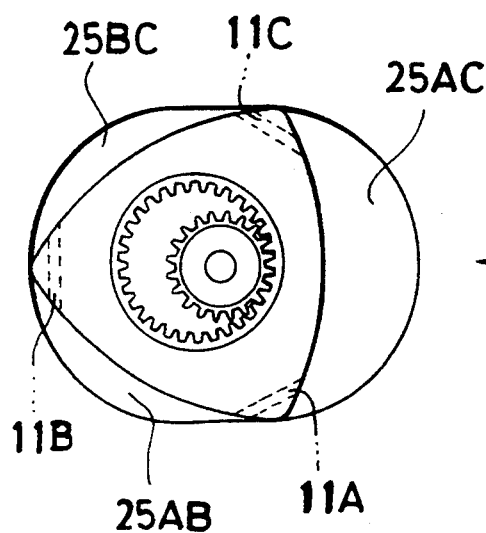
Figure 7C:
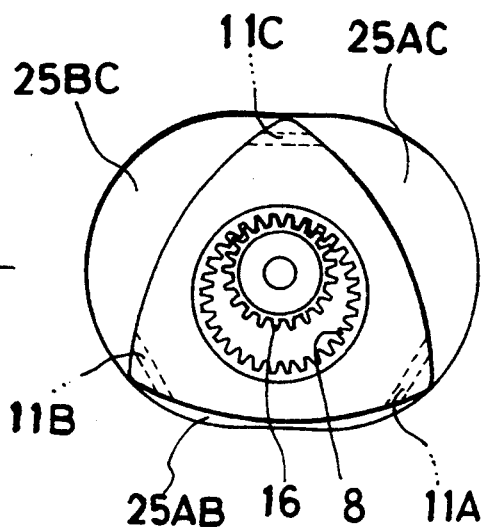

In the state of FIG. 7(C) in which the volume of the compartment 25AB is minimum, the viscous liquid in the compartment 25AB will stop flowing into the adjacent compartments 25AC and 25BC. On the other hand, the rotation of the rotor 2 gradually increases the volume of the compartment 25AC and decreases the volume of the compartment 25BC. Therefore, the viscous liquid in the compartment 25BC now flows into the compartment 25AC through the communication hole 11C. The flow resistance thus occurring acts as rotation resistance on the main shaft 5 to manifest the damping effect.

When the rotor 2 is rotated further into the state of FIG. 7(D) in which the volume of the compartment 25AC is maximum, the viscous liquid ceases its flow into the compartment 25AC. However, the volume of the compartment 25AB becomes larger and larger and that of the compartment 25BC becomes smaller and smaller. Consequently, the viscous liquid in the compartment 25BC flows through the communication hole 11B into the compartment 25AB. This flow resistance acts as rotation resistance on the main shaft 5 to manifest the damping effect.

Further rotation of the rotor 2 gradually decreases the volume of the compartment 25AC gradually, increases the volume of the compartment 25AB and decreases the volume of the compartment 25BC. Since the viscous liquid thus continues flowing from the compartment of decreasing volume to a compartment of increasing volume, the damping function of the rotary damper 1 is continuously manifested.

When the rotor 2 revolves and is rotated within the operation chamber 3, as described above, the volume-variable compartments 25AB, 25BC and 25AC defined between the outer surface of the rotor 2 and the inner surface of the operation chamber 3 individually vary in volume. During the variation of the volumes of the compartments, the viscous liquid in a compartment of decreasing volume flows through the communication hole into the adjacent compartment. The flow resistance occurring at this time acts as rotation resistance on the rotor 2 and, in turn, as rotation resistance on the main shaft 5 to manifest the continuous damping effect of the rotary damper 1.

In the illustrated embodiment, since the ratio of the internal teeth of the trochoidal gear 8 of the rotor 2 to the external teeth of the stationary gear 16 of the housing 4 is set to be 2:3, the main shaft 5 rotates three times per rotation of the rotor 2.

Figure 8:
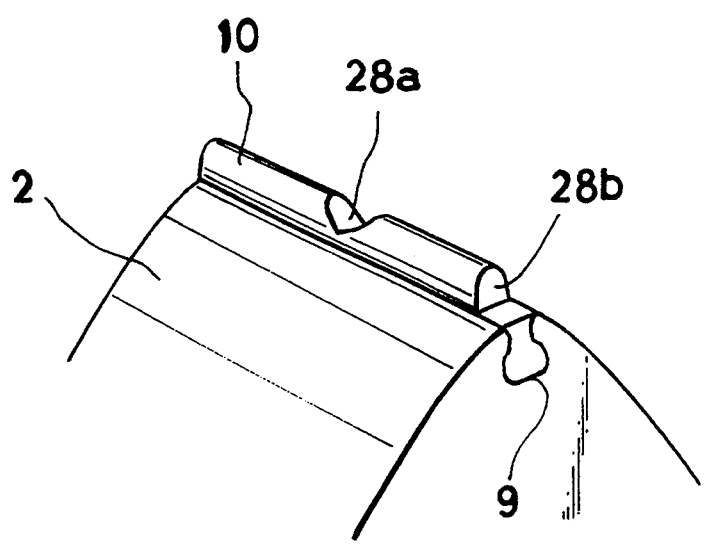
FIG. 8 is a partially cutaway perspective view of another embodiment showing an apex seal provided with communication holes.

In the aforementioned embodiment, the adjacent volume-variable compartments 25 are communicated with each other by forming the rotor 2 with the communication holes 11 through which viscous liquid passes, thereby producing flow resistance of the viscous liquid which produces rotation resistance on the rotor 2 to manifest the damping effect of the rotary damper 1. However, the present invention is not limited to this embodiment. As shown in FIG. 8, for example, the same effect can be obtained by forming notches 28a and 28b midway the length and/or at the end of the apex seal 10 of the rotor 2 in place of the communication holes 11. The notches 28a and 28b are easier to form than the communication holes 11.

If the operation shaft portion 20 is provided with a known one-way clutch (not shown) through which the main shaft 5 is connected to the outside, it is possible to cause the rotary damper 1 to exert its damping force only in a single rotation direction.

In the embodiments described so far, the interior of the operation chamber 3 has an epi-trochoidal configuration and the rotor 2 has the three sides each of an outer configuration describing the inside envelope of the epi-trochoid. However, each side of the rotor 2 may have an epi-trochoidal configuration and the operation chamber 3 may have an inside configuration describing the outer envelope of the epi-trochoid. That is to say, the inside configuration of the operation chamber 3 is defined so that when the rotor 2 is rotated the apex seals 10 slide on the inner surface of the operation chamber 3 and, at the same time, the outer configuration of the rotor 2 is defined so that it varies the volumes of the volume-variable compartments 25 without interfering with the inner surface of the operation chamber 3 when the rotor 2 revolves and is rotated within the operation chamber 3. For this reason, a peri-trochoidal or hypo-trochoidal configuration can be adopted in place of the epi-trochoidal configuration.

As described in the foregoing, according to the present invention the rotation of a rotor allows viscous liquid in a volume-variable compartment of decreasing volume to flow into an adjacent volume-variable compartment to produce flow resistance of the viscous liquid which in turn produces torque resistance on a main shaft, thereby manifesting the damping effect. Therefore, it is possible to provide a rotary damper capable of generating a large torque for its small size. In addition, since a large torque can be generated even if the viscosity of the viscous liquid is low, viscous liquid having low viscosity can be used, making the assembly of the rotary damper easier than that of the conventional rotary damper using highly viscous liquid.

What is claimed is:

1. A rotating-piston type rotary damper comprising:

a rotor formed in the shape of a substantially triangular prism having apex portions provided with apex seals, said rotor having a central circular through hole formed normal to its end faces so that one open side of said rotor serves as a fitting hole and the other open side of said rotor comprises a gear with internal teeth;

a rotor housing having an operation chamber open on one side for accommodating said rotor therein and closed on the other side which is provided with a central bearing and a coaxial stationary gear with external teeth;

a main shaft having an operation shaft portion at one end thereof and an eccentric near the other end thereof; and a lid having a through hole for permitting passage therethrough of said operation shaft portion of said main shaft;

said rotor being accommodated in said operation chamber, with said internal teeth engaged with said external teeth and said apex seals in contact with an inner surface of said operation chamber, to define volume-variable compartments between the inner surface of said operation chamber and an outer surface of said rotor;

said main shaft being inserted into said central circular through hole of said rotor, with said eccentric fitted in said fitting hole and the other end thereof supported on said central bearing;

said volume-variable compartments containing viscous liquid;

said lid covering the open side of said operation shaft portion of said rotor passing through said through hole of said lid;

said operation chamber having an inside configuration on which said apex seals of said rotor slide when said rotor rotates, and said rotor having an outside configuration not interfering with the inner surface of said operation chamber but making said volume-variable compartments variable in volume when said rotor rotates;

said rotor having communication holes for transferring said viscous liquid in a volume-variable compartment of decreasing volume into adjacent volume-variable compartments.

2. A rotary damper according to claim 1, wherein each of said communication holes comprises a through hole in said rotor normal to the end faces thereof and bores formed in adjacent sides of said rotor which extend toward said through hole.

3. A rotary damper according to claim 1, wherein each of said communication holes is formed by notches formed in said apex seals.

4. A rotary damper according to claim 1, wherein said operation chamber has an inside configuration describing an epi-trochoid and said rotor has three sides each describing an inside envelope of the epi-trochoid.

5. A rotary damper according to claim 2, wherein said operation chamber has an inside configuration describing an epi-trochoid and said rotor has three sides each describing an inside envelope of the epi-trochoid.

6. A rotary damper according to claim 3, wherein said operation chamber has an inside configuration describing an epi-trochoid and said rotor has three sides each describing an inside envelope of the epi-trochoid.

7. A rotary damper according to claim 1, wherein said rotor has three sides each describing an epi-trochoid and said operation chamber has an inside configuration describing an outside envelope of the epi-trochoid.

8. A rotary damper according to claim 2, wherein said rotor has three sides each describing an epi-trochoid and said operation chamber has an inside configuration describing an outside envelope of the epi-trochoid.

9. A rotary damper according to claim 3, wherein said rotor has three sides each describing an epi-trochoid and said operation chamber has an inside configuration describing an outside envelope of the epi-trochoid.

10. A rotating-piston type rotary damper comprising:
a rotor formed in the shape of a short substantially triangular prism having apex portions provided with apex seals and three sides each describing an inside envelope of an epitrochoid, said rotor having a central circular through hole formed vertically so that one open side thereof serves as a fitting hole and the other open side thereof is provided therein with a trochoidal phase gear with internal teeth and communication holes each open to two of the three sides;
a rotor housing having an operation chamber open on one side for accommodating said rotor therein and closed on the other side which is provided with a central bearing and a coaxial stationary gear with external teeth, said operation chamber having an inside configuration describing two epi-trochoids;
a main shaft having an operation shaft portion at one end thereof and an eccentric near the other end thereof; and
a lid having a through hole for permitting passage therethrough of said operation shaft portion of said main shaft;
said rotor being accommodated in said operation chamber, with said internal teeth engaged with said external teeth and said apex seals in contact with an inner surface of said operation chamber, to define volume-variable compartments between the inner surface of said operation chamber and an outer surface of said rotor;
said main shaft being inserted into said central circular through hole of said rotor, with said eccentric fitted in said fitting hole and the other end thereof supported on said central bearing;
said volume-variable compartments containing viscous liquid;
said lid covering the open side of said operation chamber and being fixed on said rotor housing, with said operation shaft portion of said rotor passing through said through hole of said lid;
said viscous liquid in one of said volume-variable compartments of decreasing volume being transferred into an adjacent volume-variable compartment of said volume-variable compartments through said communication holes.

* * * * *